United States Patent
Lamb

(10) Patent No.: US 10,949,389 B2
(45) Date of Patent: Mar. 16, 2021

(54) METADATA ANALYZING

(71) Applicant: UIPCO, LLC, San Antonio, TX (US)

(72) Inventor: Katherine Lamb, Canyon Lake, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 135 days.

(21) Appl. No.: 15/813,194

(22) Filed: Nov. 15, 2017

(65) Prior Publication Data

US 2018/0137111 A1    May 17, 2018

Related U.S. Application Data

(60) Provisional application No. 62/422,715, filed on Nov. 16, 2016.

(51) Int. Cl.
| | |
|---|---|
| *G06F 16/00* | (2019.01) |
| *G06F 16/14* | (2019.01) |
| *H04W 68/00* | (2009.01) |
| *G01S 19/01* | (2010.01) |
| *G06Q 40/08* | (2012.01) |
| *G06F 16/50* | (2019.01) |
| *G06F 16/432* | (2019.01) |

(52) U.S. Cl.
CPC .............. *G06F 16/14* (2019.01); *G01S 19/01* (2013.01); *G06F 16/434* (2019.01); *G06F 16/50* (2019.01); *G06Q 40/08* (2013.01); *H04W 68/005* (2013.01)

(58) Field of Classification Search
CPC .................................................... G06F 16/434
See application file for complete search history.

(56) References Cited

U.S. PATENT DOCUMENTS

| | | | |
|---|---|---|---|
| 2010/0088123 A1* | 4/2010 | McCall | G06Q 40/08 705/4 |
| 2011/0058048 A1* | 3/2011 | Elazar | H04N 1/32101 348/207.1 |
| 2015/0154712 A1* | 6/2015 | Cook | G06Q 40/08 705/4 |
| 2017/0046710 A1* | 2/2017 | Sahadevan | G06Q 20/4016 |

* cited by examiner

*Primary Examiner* — Ajith Jacob
(74) *Attorney, Agent, or Firm* — Perkins Coie LLP

(57) ABSTRACT

In embodiments, a system receives a file comprising metadata to which rules are applied. Alerts may be generated based on the rules processing of the metadata. The image file may comprise a photo. Alerts can be generated when an original timestamp of the file is after a date of loss of an object, a modified timestamp of the file is after loss of the object, a GPS (Global Positioning System) timestamp of the photo is after date of loss, and/or GPS coordinates of the photo are a certain distance from a location of the loss.

18 Claims, 4 Drawing Sheets

METADATA ANALYZING

CROSS REFERENCE TO RELATED APPLICATIONS

The present application claims the benefit of U.S. Provisional Application No. 62/422,715, filed on Nov. 16, 2016, which is incorporated herein by reference.

SUMMARY

Embodiments of the invention can process metadata for files, such as image files comprising a photo, to generate alerts when the metadata contains a potential inconsistency. Embodiments may be useful in fraud detection associated with stolen property claims, for example. Alerts can be evaluated for proper disposition of a claim, for example.

In one aspect, a method comprises: receiving a file comprising metadata; applying rules to the metadata; and generating alerts based on the rules A method can further includes one or more of the following features: receiving the file comprises receiving an image file comprising a photo, sending the alerts and the metadata to one or more clients, sending the alerts and the metadata to one or more clients comprises sending the alerts and the metadata to a device used by an insurance claims adjuster, sending the alerts and the metadata to one or more clients comprises sending the alerts and the metadata to a device used by an insurance fraud investigator, generating alerts based on the rules comprises generating an alert comprising one of: a first indication that an original timestamp of the file is after a date of loss of an object; a second indication that a modified timestamp of the file is after loss of the object; and a third indication that a GPS (Global Positioning System) timestamp of the photo is after date of loss; or a fourth indication that GPS coordinates of the photo are a certain distance from a location of the loss, and/or receiving the file comprising metadata comprises receiving the file comprising metadata comprising at least one of: a first timestamp a photo was taken, a second timestamp the photo was modified and coordinates where photo was taken.

In another aspect, a system comprises: a metadata analyzer module configured to receive a file comprising metadata from a file provider, the metadata analyzer module further configured to apply rules to the metadata and generate alerts based on the rules. A system can further include one or more of the following features: the file comprises an image file comprising a photo, the metadata analyzer module further configured to send the alerts and the metadata to one or more clients, the alerts and the metadata are sent to one or more clients comprising a device used by an insurance claims adjuster, sending the alerts and the metadata to one or more clients comprises sending the alerts and the metadata to a device used by an insurance fraud investigator, the alerts comprise one of: a first indication that an original timestamp of the file is after a date of loss of an object; a second indication that a modified timestamp of the file is after loss of the object; and a third indication that a GPS (Global Positioning System) timestamp of the photo is after date of loss; or a fourth indication that GPS coordinates of the photo are a certain distance from a location of the loss, and/or the file comprising metadata comprises at least one of: a first timestamp a photo was taken, a second timestamp the photo was modified and coordinates where photo was taken.

In a further aspect, an article comprises: a non-transitory computer readable medium having stored instructions that enable a machine to: receive a file comprising metadata; apply rules to the metadata; and generate alerts based on the rules. An article can further include instructions for one or more of the following features: receiving the file comprises receiving an image file comprising a photo, sending the alerts and the metadata to one or more clients, sending the alerts and the metadata to one or more clients comprises sending the alerts and the metadata to a device used by an insurance claims adjuster, sending the alerts and the metadata to one or more clients comprises sending the alerts and the metadata to a device used by an insurance fraud investigator, generating alerts based on the rules comprises generating an alert comprising one of: a first indication that an original timestamp of the file is after a date of loss of an object; a second indication that a modified timestamp of the file is after loss of the object; and a third indication that a GPS (Global Positioning System) timestamp of the photo is after date of loss; or a fourth indication that GPS coordinates of the photo are a certain distance from a location of the loss, and/or receiving the file comprising metadata comprises receiving the file comprising metadata comprising at least one of: a first timestamp a photo was taken, a second timestamp the photo was modified and coordinates where photo was taken.

In another aspect, a method comprises: displaying alert information relating to fraudulent insurance claims, comprising displaying a photo associate with a claim; displaying an alert section proximate the photo; and displaying alerts in the alert section generated by a metadata analyzer module configured to receive the photo and metadata from a file provider, wherein the metadata analyzer module is further configured to apply rules to the metadata and generate the alerts. The alerts can comprise one of: a first indication that an original timestamp of the file is after a date of loss of an object; a second indication that a modified timestamp of the file is after loss of the object; and a third indication that a GPS (Global Positioning System) timestamp of the photo is after date of loss; or a fourth indication that GPS coordinates of the photo are a certain distance from a location of the loss.

DETAILED DESCRIPTION

Described herein are techniques to analyze metadata from a file. In one particular example, the file is an image file that includes a photo. In one particular example, the metadata is analyzed to determine if certain anomalies or inconsistencies exist. The techniques described are not limited by the examples used herein. For example, while the techniques are described using a photo file uploaded in an insurance claim, the techniques may be used in other examples such as banking (e.g., analyzing uploaded deposit checks). In some examples, the features described herein may be used in fraud detection. For example, if a photo of an object claimed to be lost is taken after the loss. In another example, a photo is taken not at the location where the loss was claimed but rather at a pawn shop.

Figure 1:
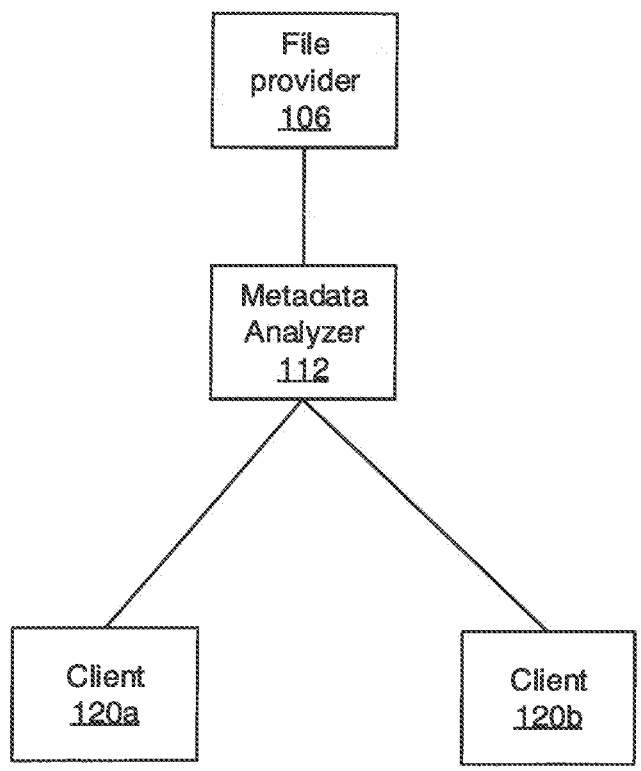
FIG. 1 is a simplified block diagram of one example of a system to analyze metadata.

Referring to FIG. 1, a system 100 is an example of a system to analyze metadata from a file. The system 100 includes a file provider 106, a metadata analyzer 112 and one or more clients (e.g., a client 120a and a client 120b). The file provider 106 provides a file with metadata to the metadata analyzer 112. In some examples, the file provider 106 may be a mobile device or a personal computer.

The metadata analyzer 112 evaluates the metadata using rules and provides the metadata to one or more clients (e.g., client 120a, client 120b). The metadata analyzer 112 may also provide alerts to the one or more clients depending on the rules.

In some examples, one or more of the clients 120a, 120b may be a mobile device or a personal computer. In one particular example, the client 120a may be a device used by a claims adjuster and the client 120b may be a device used by a fraud investigator. In some examples, a file may be an image file, a portable document file (pdf) and so forth that includes metadata. In one particular example, the file is an image file that includes a photo.

Figure 2:
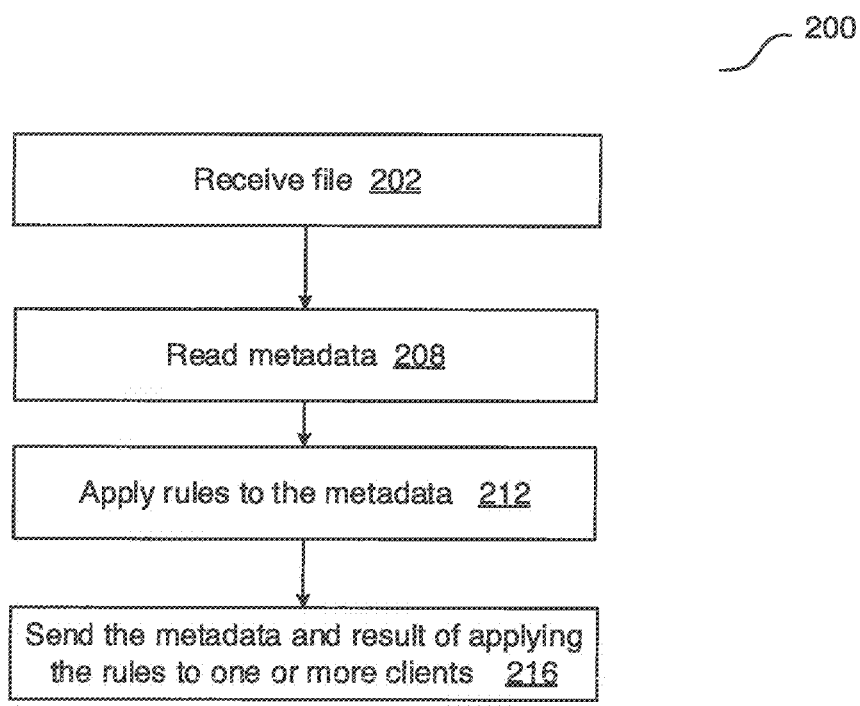
FIG. 2 is a flowchart of an example of a process to analyze metadata.

In some examples, for an image file with a photo, metadata may include GPS (Global Positioning System) coordinates where the photo was taken, a time the photo was taken, the device used to take the photo, the time the file was modified and so forth. Referring to FIG. 2, a process 200 is an example of a process to analyze metadata. In one particular example, the metadata analyzer 112 performs the process 200.

Process 200 receives a file (202). For example, a file is sent by the file provider 106 to the metadata analyzer 112. In one particular example, the file is an image file that includes a photo taken by a mobile device and the mobile device uploads the image file to the metadata analyzer 112 using a mobile application. In one particular example, the photo is used in conjunction with an insurance claim for a loss of an object including objects that may be stolen. In another particular example, the photo is used to deposit a check to a banking institution.

Process 200 reads the metadata (208) and applies rules to the metadata (212). For example, the metadata analyzer 112 reads the metadata from the file and the metadata analyzer 112 applies the rules to the metadata. In one example, one or more rules may include comparing a first date to a second date. In one particular example, a first date is a date a photo of an object is taken and it is compared to a second date that the object was reported lost. In another particular example, a first date is a date a photo of an object is modified and the first date is compared to a second date that the object was reported lost. In a further particular example, a first date is a GPS timestamp of a photo of an object and the first date is compared to a second date that the object was reported lost.

In another example, a rule may include comparing the GPS coordinates at a first location with GPS coordinates at a second location. In one particular example, the GPS coordinates of where the photo of an object is compared to a location where the object was reported lost and a distance is determined.

Process 200 sends the metadata and result of the applying the rules to one or more clients (216). In one particular example, an alert may be generated based on the rules. For example, an alert may indicate that the original timestamp of the file is after a data of loss of the object. In another example, an alert may indicate that the modified timestamp of the file is after loss of the object. In a further example, an alert may indicate that the GPS timestamp of the photo is after the date of loss. In a still further example, an alert may indicate that the GPS coordinates of the photo are a certain distance from the loss location.

In one particular example, if no alert is generated using the rules, then the metadata is sent to the client 120a. In another particular example, if one or more alerts are generated using the rules, then the metadata and alerts are sent to the client 120a and the client 120b.

Figure 3:
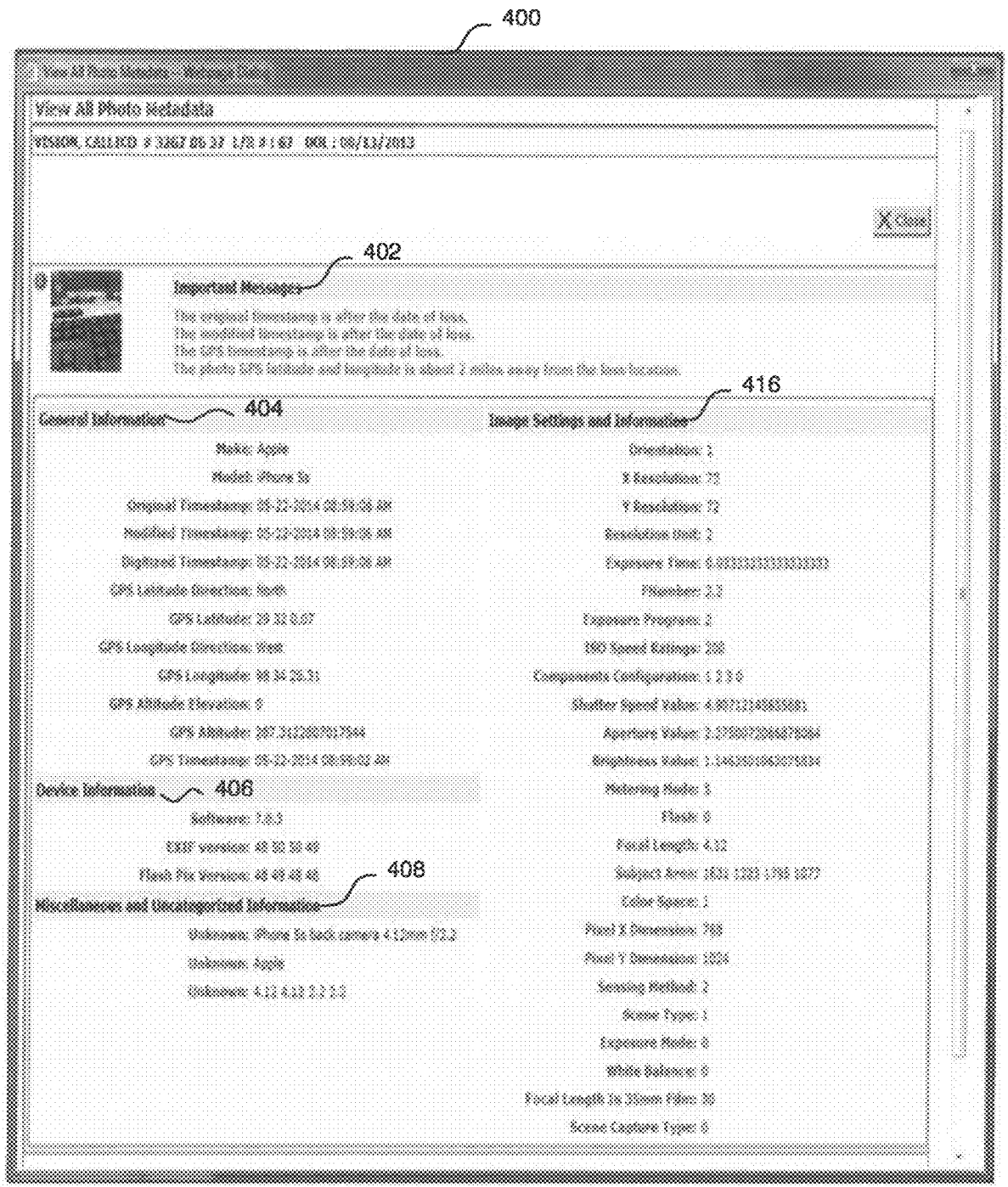
FIG. 3 is a diagram of an example of a screenshot depicting alerts and metadata.

Referring to FIG. 3, an example of a screenshot that may be presented to one or more clients 120a, 120b is a screenshot 400. For example, the screenshot 400 is an example of providing metadata and alerts for an image file with a photo after applying the rules. The screenshot 400 may include an alerts section 402. For example, the alerts section 402 may indicate one or more of the following: the original timestamp of the file is after a date of loss of the object, the modified timestamp of the file is after loss of the object, the GPS timestamp of the photo is after date of loss and/or the GPS coordinates of the photo are a certain distance from the loss location.

The screenshot 400 may also include one or more metadata sections. In one particular example, the metadata section may include, for example, one or more of a general information section 404, a device information section 406, a miscellaneous and uncategorized information section 408 and/or an image settings and information section 416. In one example, the general information section 404 may include one or more of a make and model of the device producing the photo, the original timestamp of the photo, digitized timestamp of the photo, GPS latitude direction where the photo was taken, GPS latitude of where the photo was taken, GPS longitude direction of where the photo was taken, GPS longitude of where the photo was taken, GPS altitude elevation of where the photo was taken, GPS altitude where the photo was taken and/or a GPS timestamp when the GPS was taken.

The device information section 406 may include one or more of software on the device, the EXIF (Exchangeable image file format) version and/or a Flash Pix version. The miscellaneous and uncategorized information section 408 may include information on which camera is being used, manufacturer, focal length, f number and so forth.

The image settings and information section 416 may include one or more of the following: Orientation, X resolution, Y resolution, Resolution Unit, exposure time, F number, exposure program, ISO speed ratings, components package, shutter speed value, aperture value, brightness value, metering mode, flash, focal length, subject area, color space, pixel X dimension, pixel Y direction, sensing method, scene type, exposure mode, white balance, focal length in 35 mm film and/or scene capture type.

Figure 4:
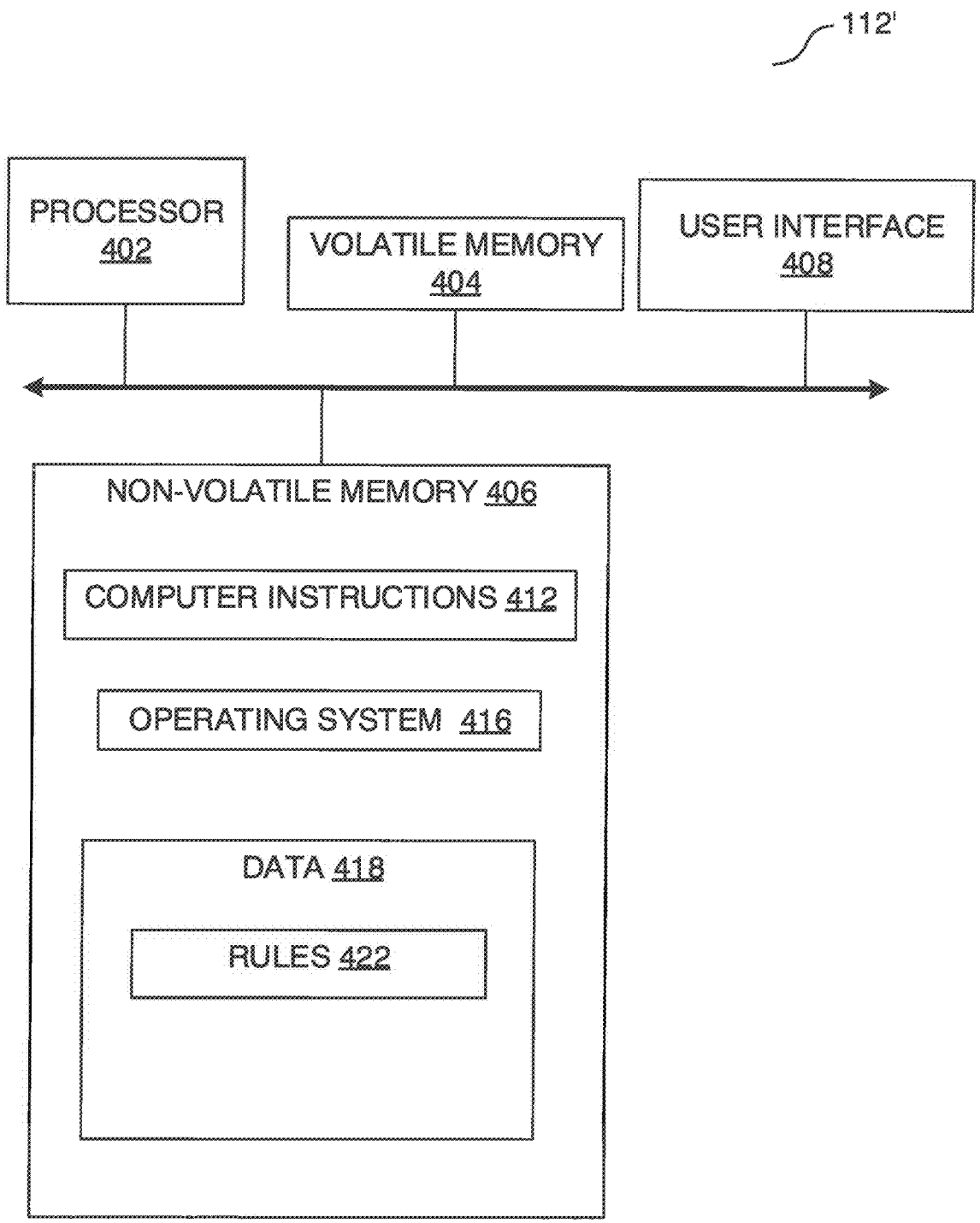
FIG. 4 is a computer on which any portion of the process of FIG. 2 may be implemented, according to one embodiment of the disclosure.

Referring to FIG. 4, in one example, one or more of the metadata extractors 104a-104c may be a metadata extractor 104. The metadata extractor 104 may include a processor 402, a volatile memory 404, a non-volatile memory 406 (e.g., hard disk, flash memory) and the user interface (UI) 408 (e.g., a graphical user interface, a mouse, a keyboard, a display, touch screen and so forth). The non-volatile memory 406 may store computer instructions 412, an operating system 416 and data 418 including rules 422. In one example, the computer instructions 412 may be executed by the processor 402 out of volatile memory 404 to perform at least a portion of the processes described herein (e.g., process 200).

The processes described herein (e.g., process 200) are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   receiving an image file comprising a photo in connection to an insurance claim;
   obtaining, from the image file, metadata including a first timestamp that indicates when the photo was taken, a second timestamp that indicates when the photo was modified, global positioning system (GPS) coordinates that indicate a location the photo was taken, and an indication of a focal length of a camera used to take the photo;
   determining whether the insurance claim is potentially fraudulent by:
      comparing the first timestamp that indicates when the photo was taken with a date of loss in connection with the insurance claim,
      comparing the second timestamp that indicates when the photo was modified with the date of loss related to the insurance claim, and
      comparing the location the photo was taken with a location of loss related to the insurance claim; and
   in response to determining that the insurance claim is potentially fraudulent, generating alerts that the location the photo was taken is a certain distance from the location of loss related to the insurance claim.

2. The method of claim 1, wherein the metadata further includes an indication of a device used to take the photo.

3. The method of claim 1, further comprising sending the alerts and the metadata to one or more clients.

4. The method of claim 3, wherein sending the alerts and the metadata to one or more clients comprises sending the alerts and the metadata to a device used by an insurance claims adjuster.

5. The method of claim 3, wherein sending the alerts and the metadata to one or more clients comprises sending the alerts and the metadata to a device used by an insurance fraud investigator.

6. The method of claim 1, wherein the insurance claim is potentially fraudulent in response to any one of:
   the first timestamp being after the date of loss in connection with the insurance claim;
   the second timestamp being after the date of loss related to the insurance claim; or
   the location the photo was taken being a certain distance from the location of loss related to the insurance claim.

7. A system, comprising:
   a memory;
   a processor in communication with the memory, the processor operable to execute software modules, the software modules comprising:
      a metadata analyzer module configured to receive an image file comprising a photo in connection to an insurance claim;
      obtain, from the image file, metadata including a first timestamp that indicates when the photo was taken, a second timestamp that indicates when the photo was modified, global positioning system (GPS) coordinates that indicates a location the photo was taken, and an indication of a focal length of a camera used to take the photo;

determine whether the insurance claim is potentially fraudulent by:
  comparing the first timestamp that indicates when the photo was taken with a date of loss in connection with the insurance claim,
  comparing the second timestamp that indicates when the photo was modified with the date of loss related to the insurance claim, and
  comparing the location the photo was taken with a location of loss related to the insurance claim; and
in response to determining that the insurance claim is potentially fraudulent, generate alerts that the location the photo was taken is a certain distance from the location of loss related to the insurance claim.

8. The system according to claim 7, wherein the metadata further includes an indication of a device used to take the photo.

9. The system according to claim 7, wherein the metadata analyzer module is further configured to send the alerts and the metadata to one or more clients.

10. The system according to claim 9, wherein sending the alerts and the metadata to one or more clients comprises sending the alerts and the metadata to a device used by an insurance claims adjuster.

11. The system according to claim 9, wherein sending the alerts and the metadata to one or more clients comprises sending the alerts and the metadata to a device used by an insurance fraud investigator.

12. The system according to claim 7, wherein the insurance claim is potentially fraudulent in response to any one of:
  the first timestamp being after the date of loss in connection with the insurance claim;
  the second timestamp being after the date of loss related to the insurance claim; or
  the location the photo was taken being a certain distance from the location of loss related to the insurance claim.

13. A non-transitory machine-readable medium having machine executable instructions stored thereon that, when executed by one or more processors, direct the one or more processors to perform a method comprising:
  receiving an image file comprising a photo in connection to an insurance claim;
  obtaining, from the image file, metadata including a first timestamp that indicates when the photo was taken, a second timestamp that indicates when the photo was modified, global positioning system (GPS) coordinates that indicates a location the photo was taken, and an indication of a focal length of a camera used to take the photo;
  determining whether the insurance claim is potentially fraudulent by:
    comparing the first timestamp that indicates when the photo was taken with a date of loss in connection with the insurance claim,
    comparing the second timestamp that indicates when the photo was modified with the date of loss related to the insurance claim, and
    comparing the location the photo was taken with a location of loss related to the insurance claim; and
  in response to determining that the insurance claim is potentially fraudulent, generating alerts that the location the photo was taken is a certain distance from the location of loss related to the insurance claim.

14. The non-transitory machine-readable medium of claim 13, wherein the metadata further includes an indication of a device used to take the photo.

15. The non-transitory machine-readable medium of claim 13, wherein the method further comprises sending the alerts and the metadata to one or more clients.

16. The non-transitory machine-readable medium of claim 15, wherein sending the alerts and the metadata to one or more clients comprises sending the alerts and the metadata to a device used by an insurance claims adjuster.

17. The non-transitory machine-readable medium of claim 15, wherein sending the alerts and the metadata to one or more clients comprises sending the alerts and the metadata to a device used by an insurance fraud investigator.

18. The non-transitory machine-readable medium of claim 13, wherein the insurance claim is potentially fraudulent in response to any one of:
  the first timestamp being after the date of loss in connection with the insurance claim;
  the second timestamp being after the date of loss related to the insurance claim; or
  the location the photo was taken being a certain distance from the location of loss related to the insurance claim.

* * * * *